Oct. 18, 1955  E. F. SCHWELLER  2,720,762
EVAPORATOR FOR REFRIGERATING APPARATUS
Filed April 15, 1952  2 Sheets-Sheet 1
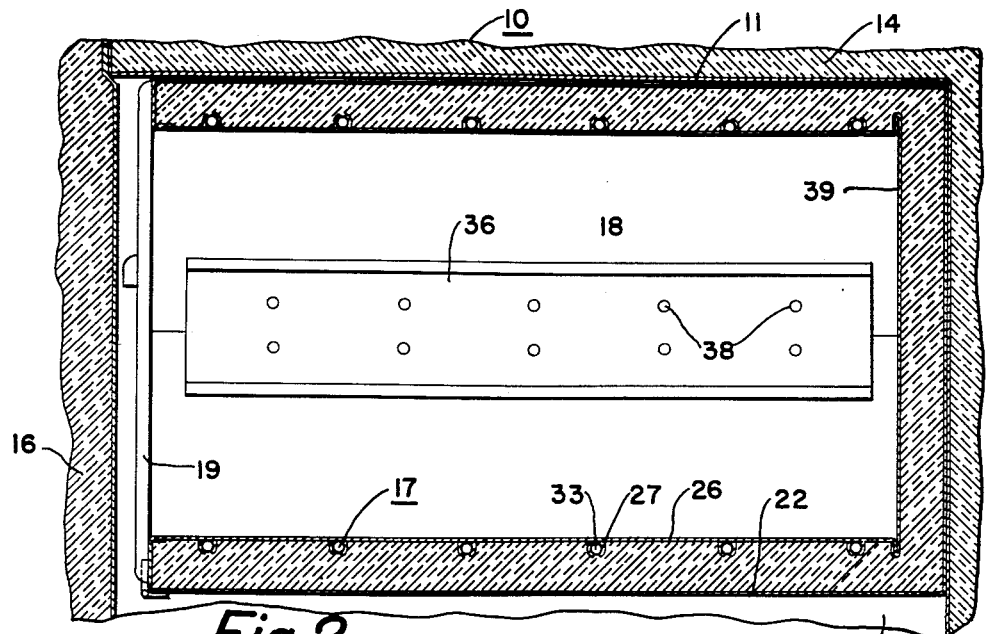
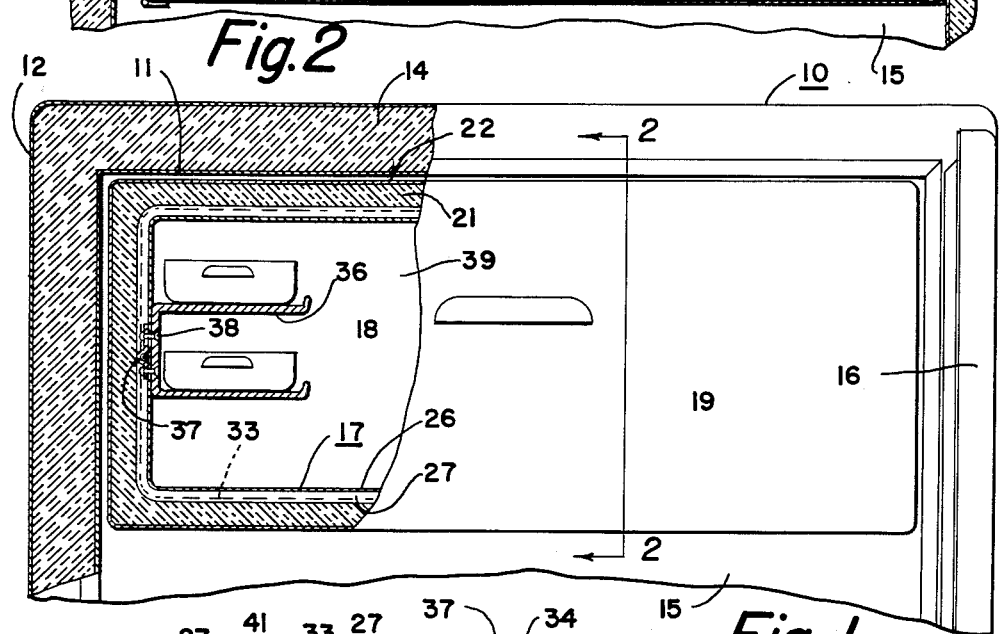
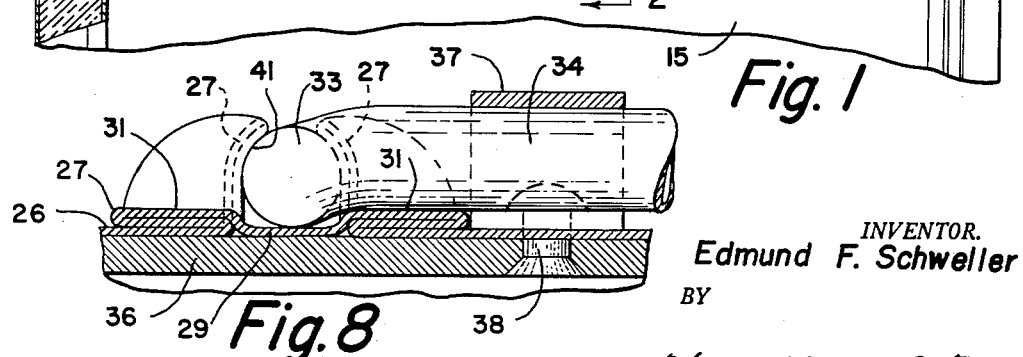
INVENTOR.
Edmund F. Schweller
BY
Willits, Hardman & Fehr.

Oct. 18, 1955 E. F. SCHWELLER 2,720,762
EVAPORATOR FOR REFRIGERATING APPARATUS
Filed April 15, 1952 2 Sheets-Sheet 2
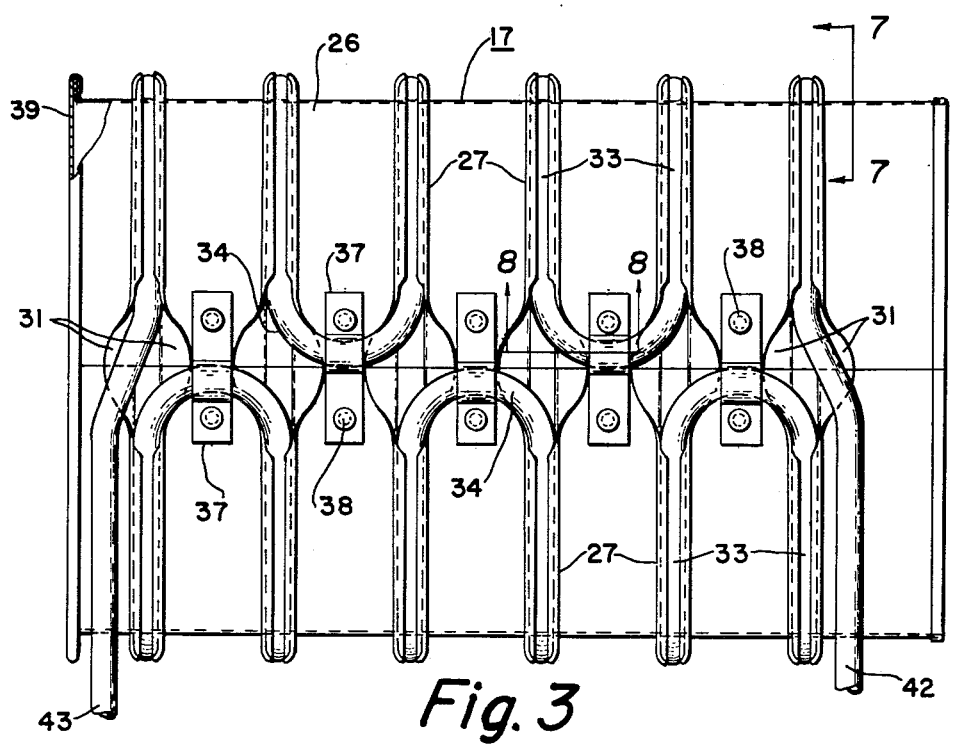
*Fig. 3*
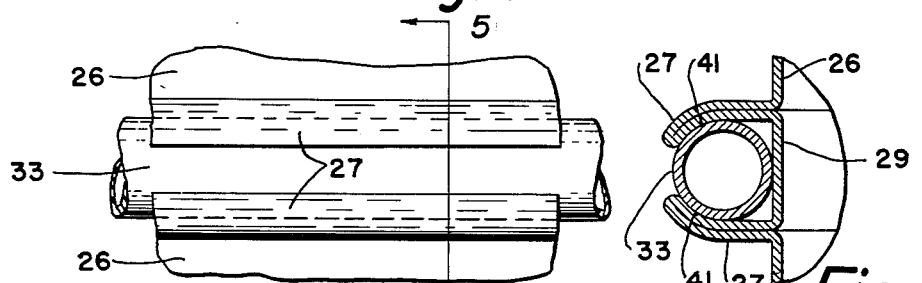
*Fig. 4*
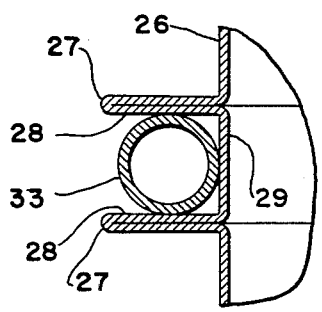
*Fig. 6*
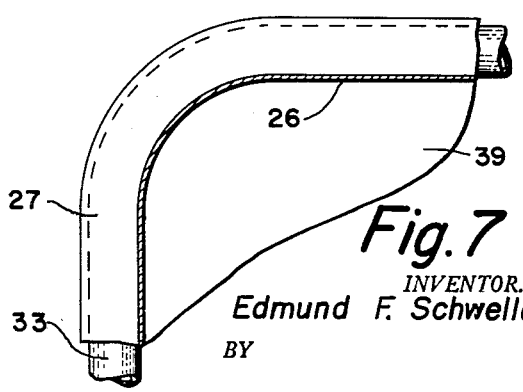
*Fig. 5*
*Fig. 7*
INVENTOR.
Edmund F. Schweller
BY
Willits, Hardman & Fehr.

United States Patent Office 2,720,762
Patented Oct. 18, 1955

2,720,762

EVAPORATOR FOR REFRIGERATING APPARATUS

Edmund F. Schweller, Dayton, Ohio, assignor to General Motors Corporation, Dayton, Ohio, a corporation of Delaware Application April 15, 1952, Serial No. 282,369

3 Claims. (Cl. 62—126)

This invention relates to refrigeration and more particularly to evaporators of cooling units of mechanical refrigerating systems.

I am aware of the fact that many different types of evaporators for refrigerating systems have heretofore been proposed and produced. I am familiar with sheet metal evaporators heretofore produced and which have been formed by brazing or otherwise suitably securing an embossed metal sheet to a flat metal sheet to provide refrigerant passages between the bonded together sheets. Such evaporators are expensive to make due to difficulties in properly sealing the metal sheets together to avoid leaks of refrigerant from refrigerant passages therebetween and the necessity of flushing the passages clear of oxides and other foreign matter accumulated in the passages during bonding of the sheets to one another. I, therefore, contemplate the provision of an efficient and inexpensive evaporator for a refrigerating system wherein no brazing or welding operations are required in the fabrication thereof.

An object of my invention is to provide a simplified and improved form of a sheet metal cooling unit or evaporator for a refrigerating system.

Another object of my invention is to provide an evaporator in which a conduit is formed or provided in a wall of a single sheet of metal and the sheet shaped to provide the desired form of evaporator.

A further object of my invention is to fabricate an evaporator for a refrigerating system from a single sheet of metal having a refrigerant conduit incorporated in the walls thereof and wherein the inner surface of walls of a cooling chamber formed by the shaped sheet of metal is flat and smooth.

A still further and more specific object of my invention is to bend or fold a single sheet of metal to provide a plurality of walls of a cooling or freezing chamber and to provide means on the sheet for clamping a continuous coiled refrigerant conducting tube thereto for conveying refrigerant about or along the walls of the chamber to thus eliminate difficult, troublesome and expensive brazing or welding operations in the manufacture of sheet metal evaporators for refrigerating systems.

Further objects and advantages of the present invention will be apparent from the following description, reference being had to the accompanying drawings, wherein a preferred form of the present invention is clearly shown.

In the drawings:

Figure 1 is a front view of the upper portion of a refrigerator cabinet partly in section and partly in elevation having an evaporator constructed in accordance with the present invention located therein;

Figure 2 is a fragmentary vertical cross-sectional view taken on the line 2—2 of Figure 1;

Figure 3 is an enlarged side view of the evaporator shown in Figures 1 and 2 with the insulating material about the same removed;

Figure 4 is an enlarged fragmentary view showing a tube clamped to a wall of the evaporator by double walled ribs formed from a sheet of metal;

Figure 5 is a fragmentary cross-sectional view taken on the line 5—5 of Figure 4 showing a pair of ribs bent toward one another against the tube for securing the same to the evaporator;

Figure 6 is a sectional view similar to Figure 5 showing a tube in a channel between a pair of ribs prior to bending the ribs over and against the tube;

Figure 7 is a fragmentary sectional view taken on the line 7—7 of Figure 3 showing the metal sheet of the evaporator and the tube clamped thereto at one corner of a cooling chamber provided by the metal sheet; and Figure 8 is an enlarged sectional view taken on the line 8—8 of Figure 3 showing the folding of the end portions of the double walled ribs adjacent ends of the single sheet of metal from which the evaporator of the present disclosure is fabricated.

Referring to the drawings, I have shown in Figure 1 thereof a refrigerator cabinet 10 comprising an inner metal liner 11 and an outer metal shell or panels 12 having insulating material 14 disposed therebetween. Liner 11 forms walls of a food storage compartment 15 within cabinet 10 and this compartment may be cooled in any suitable or desirable manner. Various ways of cooling compartment 15 is now common and conventional in the art and need not be described herein. A door 16, shown in open position in Figure 1 and in closed position in Figure 2, normally closes the access opening leading to food compartment 15. Within the upper portion of food storage compartment 15 there is mounted, in any suitable or desired manner, an insulated box-like structure comprising a refrigerant evaporator or cooling unit, generally represented by the reference character 17, constructed according to my invention and forming walls of an open front cooling or freezing chamber 18 which has its open front normally closed by a separate door 19. Any suitable or desirable insulating material 21 surrounds walls of evaporator 17 and a metal shell 22 encases both the evaporator 17 and the insulating material 21 to seal these elements from air separately cooled and caused to circulate within the food storage compartment 15. The evaporator or cooling unit 17 forms a part of a closed refrigerating system and has conduit connections with a refrigerant translating device of a closed refrigerating system (not shown) preferably located in a machine compartment at the bottom of the refrigerator cabinet 10. This device may include a motor-compressor-condenser unit of any suitable or desirable construction and arrangement as is well known to those skilled in the art.

In the formation of evaporator 17 of the present invention a sheet of metal 26, preferably aluminum which can be readily bent and/or folded, is formed with a plurality of pairs of spaced apart double walled ribs 27 (see Figure 6) projecting therefrom. Each rib 27 of the pairs thereof is formed by creasing or crimping the metal sheet 26 and bending the same laterally therefrom along predetermined lines and thereafter reversely crimping and bending the sheet as at 28 (see Figure 6) to fold the same back upon itself so as to provide the ribs 27 with a double wall. The outward extension or projection of ribs 27 from the main portion of sheet 26 is greater than the diameter of a tube to be placed between the pairs of ribs 27 in a manner to be hereinafter described. That portion 29 of the metal sheet 26, intermediate each pair of double walled ribs 27, is held parallel to and in alignment with the portion of the sheet on either side of the pair of ribs 27 so that a substantially flat smooth surface is present on the side of the metal sheet opposite the side thereof from which the ribs project. The crevice between the two layers of metal at the base of the double walled ribs 27 is minute and hardly noticeable along the interior surface of walls of chamber 18. Portions 29 of sheet 26 cooperate with the pairs of double walled ribs 27 to provide a substantially U-shaped channel therebetween. After the pairs of ribs 27 are formed from metal sheet 26 a portion of the ribs at the ends of the sheet are flattened down against the sheet as at 31 (see Figures 3 and 8). The ends of sheet 26 and a portion of the flattened down ribs 27 are trimmed off the sheet to provide squared mating ends thereon. This trimmed sheet is then bent in a direction transverse to the direction of an extension of ribs 27 to form all of one side, the top, and the bottom walls of the cooling or freezing chamber 18 while the squared mating ends of the sheet are brought together to cause portions adjacent thereto to form one part of the other side wall of chamber 18 (see Figures 1, 2 and 3). Sheet 26 being of relatively soft aluminum permits the double walled ribs 27 to be readily bent around a suitable mandrel or die to provide chamber 18 with rounded corners connecting the various walls thereof (see Figure 7). The alignment of portions 29 of sheet 26 with the other portions thereof, beyond the pairs of ribs 27, provide chamber 18 with substantially flat smooth inner wall surfaces.

After fabricating metal sheet 26 in the manner just described a continuous length of precoiled round tubing 33 is assembled to and extends around the exterior wall surfaces of evaporator 17 with its straight runs disposed in the channels between the pairs of double walled ribs 27 (see Figures 3 and 6). Since the single metal sheet herein employed to form walls of the evaporator 17 is of aluminum I also preferably desire to utilize a tube for association therewith which is a good conductor of heat such, for example, as copper tubing. The looped portions 34 (see Figure 3) of the coiled tube 33 lie over and rest against the flattened parts 31 of ribs 27 near the ends of sheet 26 where the straight runs of the tube 33 enter the channel between adjacent ribs of each pair thereof. A substantially U-shaped metal shelf forming member 36 is inserted in chamber 18 and a plurality of straps or brackets 37 are placed over the looped portions 34 of tube 33. Rivets 38 are passed through suitable holes provided in the straps or brackets 37, in end portions of sheet 26 and in member 36. The ends of these rivets 38 are peened over against member 36 to rigidly fasten this member to the inner side of the wall of evaporator 17, within chamber 18, and brackets 37 to the outer side of this evaporator wall to rigidly clamp the brackets 37 to member 36 and to tie the mating edges of the ends of sheet 26 to one another. Thus the rivets 38, brackets 37 and shelf forming member 36 in addition to forming the means for tying and holding the ends of sheet 26 in alignment with one another and the edges of these ends in abutting relation also clamp the looped portions 34 of coil or tube 33 in contact with the sheet 26. The legs of U-shaped member 36 provide horizontal shelves within the cooling or freezing chamber 18 for reception of trays containing water to be frozen by the cooling effect produced by evaporator 17. A back plate 39 (see Figure 3) is fastened to the rear edge of the fabricated metal sheet 26 to close the rear portion of the cooling or freezing chamber 18. This back plate 39 may be attached to evaporator 17 at any suitable or desirable time during the fabrication thereof.

In order to rigidly clamp the straight runs of tube 33, within the channels between the pairs of ribs 27, into intimate thermal contact with metal sheet 26, or walls of chamber 18, the outer edge of each double walled rib 27 of the pairs thereof are bent toward one another and against the tube 33 as at 41 (see Figure 5). These ribs 27 being normally of a width to extend outwardly from the walls of cooling chamber 18 a greater distance than the diameter of tube 33 thus substantially embrace the tube to clamp and lock the same in direct heat transfer contact with walls of chamber 18. Since the tube 33 of evaporator 17 forms a part of a closed refrigerating system it necessarily includes a refrigerant inlet end 42 (see Figure 3) to which a restrictor or expansion valve is connected for controlling the entrance or expansion of liquid refrigerant into the evaporator tubing. The outlet end 43 of tube 33 of evaporator 17 has a conduit connection with the compressor of the motor-compressor-condenser unit of the refrigerant translating device of the closed refrigerating system.

From the foregoing it should be apparent that my invention resides in the construction of a cooling element or evaporator by which the refrigerant evaporating tubing thereof is made a component part of the sheet metal walls of the freezing or cooling chamber produced by fabricating a single metal sheet as herein shown and described. My improved evaporator in addition to requiring less sheet metal than prior double walled sheet metal evaporators can be manufactured at a minimum of cost due to the fact that brazing or welding operations are entirely dispensed with. My improved method of rigidly clamping a refrigerant conducting tube or conduit to a single sheet of metal fabricated to provide an evaporator with a plurality of walls so as to form a cooling or freezing chamber renders the tube an effective dissipator of cold and highly efficient in transferring heat from walls of the cooling chamber to refrigerant in the sealed passage of the tubing. By forming the double walled tube retaining ribs in the present disclosure so that the crevice at the base of the ribs is small and the metal on each side thereof is flat and smooth the fabrication of the single sheet of metal does not impair or interfere with the sliding of trays or frozen packages of food along walls of the freezing chamber.

While the form of embodiment of the invention as herein disclosed constitutes a preferred form, it is to be understood that other forms might be adopted, as may come within the scope of the claims which follow.

What is claimed is as follows:

1. An evaporator of a refrigerating system comprising a casing formed from a single flat rectangular piece of sheet metal having its mating ends brought into abutting relation and being shaped to provide the top, bottom and side walls of a cooling chamber, means for rigidly tying said ends of said sheet to one another, said metal sheet having portions along predetermined lines paralleling the length thereof crimped laterally therefrom and thence crimped back upon itself to provide spaced apart double walled ribs projecting outwardly from and extending substantially around all walls of said chamber, that portion of said sheet intermediate said ribs being parallel to and in alignment with walls of said chamber to provide substantially flat smooth surfaces along the interior thereof, said intermediate portion of said sheet cooperating with said ribs to provide a channel therebetween, a tube disposed in said channel, the outer edge of said double walled ribs being bent toward one another against said tube to rigidly clamp the tube to walls of said chamber, and said tube providing a sealed passage for conducting a refrigerant along said chamber walls.

2. An evaporator of a refrigerating system comprising a casing formed from a single flat piece of sheet metal having its mating ends brought into abutting relation and being shaped to provide the top, bottom and side walls of a cooling chamber, means for aligning the mating ends of said sheet with one another and rigidly tying said ends together in said abutting relation, said metal sheet having portions along predetermined lines thereof crimped laterally therefrom and thence crimped back upon itself to provide spaced apart double walled ribs projecting outwardly from walls of said chamber, a tube extending over walls of said chamber adjacent said ribs, the outer edge portion of said double walled ribs being bent over said tube to rigidly clamp the same against said chamber walls, said tube providing a sealed passage of conducting refrigerant into heat exchange relationship with walls of said chamber, and a part of said aligning and tying means being shaped to provide a support within said chamber for the reception of a receptacle adapted to contain a substance to be chilled by said evaporator.

3. An evaporator of a refrigerating system comprising a casing formed from a single flat piece of sheet metal having its mating ends brought into abutting relation and being shaped to provide the top, bottom and side walls of a cooling chamber, means for aligning the mating ends of said sheet with one another and rigidly tying said ends together in said abutting relation, said metal sheet having portions along predetermined lines paralleling the length thereof crimped laterally therefrom and thence crimped back upon itself to provide spaced apart double walled ribs projecting outwardly from and extending substantially around all walls of said chamber, that portion of said sheet intermediate said ribs being parallel to and in alignment with walls of said chamber to provide substantially flat smooth surfaces along the interior thereof, said intermediate portion of said sheet cooperating with said ribs to provide a channel therebetween, a tube disposed in said channel, the outer edge of said double walled ribs being bent toward one another against said tube to rigidly clamp the tube to walls of said chamber, said tube providing a sealed passage for conducting a refrigerant into heat exchange relationship with said chamber walls, and a part of said aligning and tying means being a substantially U-shaped member the legs of which provided spaced apart superimposed supports within said chamber for the reception of receptacles adapted to contain a substance to be chilled by said evaporator.

References Cited in the file of this patent

UNITED STATES PATENTS

| | | |
|---|---|---|
| 1,996,808 | Heitman | Apr. 9, 1935 |
| 2,190,288 | Higham | Feb. 13, 1940 |
| 2,646,259 | Powell | July 21, 1953 |